United States Patent
Hague et al.

(10) Patent No.: US 10,915,236 B2
(45) Date of Patent: *Feb. 9, 2021

(54) USER INTERFACE DESIGN SYSTEM

(71) Applicant: TARGET BRANDS, INC., Minneapolis, MN (US)

(72) Inventors: Devon Hague, Minneapolis, MN (US); Eric Weidmann, Minneapolis, MN (US)

(73) Assignee: Target Brands Inc., Minneapolis, MN (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/294,526

(22) Filed: Mar. 6, 2019

(65) Prior Publication Data
US 2019/0205023 A1    Jul. 4, 2019

Related U.S. Application Data

(63) Continuation of application No. 15/010,563, filed on Jan. 29, 2016, now Pat. No. 10,268,355.

(60) Provisional application No. 62/110,124, filed on Jan. 30, 2015.

(51) Int. Cl.
*G06F 16/958* (2019.01)
*G06F 3/0484* (2013.01)

(52) U.S. Cl.
CPC ........ *G06F 3/04847* (2013.01); *G06F 16/958* (2019.01)

(58) Field of Classification Search
CPC ............................ G06F 3/04847; G06F 16/958
See application file for complete search history.

(56) References Cited

U.S. PATENT DOCUMENTS

| | | | |
|---|---|---|---|
| 5,633,996 A * | 5/1997 | Hayashi | G06F 40/103 715/246 |
| 6,802,058 B2 * | 10/2004 | Banavar | G06F 9/451 717/138 |
| 7,278,098 B1 | 10/2007 | Boye et al. | |
| 7,574,653 B2 | 8/2009 | Croney et al. | |
| 7,900,137 B2 | 3/2011 | Ivarsoy et al. | |
| 8,751,945 B1 | 6/2014 | Hsu et al. | |
| 9,588,667 B2 | 3/2017 | Singhal et al. | |
| 9,996,566 B2 | 6/2018 | Ben-Aharon et al. | |

(Continued)

OTHER PUBLICATIONS

Vitaly Friedman, "Applying Divine Proportion to Your Web Designs," Smashing Magazine, found online at: http://www.smashingmagazine.com/2008/05/29/applying-divine-proportion-to-web-design/ ; May 29, 2008 (8 pages).

(Continued)

*Primary Examiner* — Dino Kujundzic
(74) *Attorney, Agent, or Firm* — Hamre, Schumann, Mueller & Larson, P.C.

(57) ABSTRACT

Systems and methods for providing one or more user interface layouts are disclosed. The method includes receiving one or more user interface parameters from an input device of a web designer device; identifying, by the web designer device, one or more user interface layouts based on the one or more user interface parameters received; and providing the one or more user interface layouts identified to be stored in a user interface layout library database, the one or more user interface layouts being configurable by the web designer device.

18 Claims, 9 Drawing Sheets

(56) References Cited

U.S. PATENT DOCUMENTS

| | | | |
|---|---|---|---|
| 10,139,998 B2 | 11/2018 | Glasgow et al. | |
| 10,614,156 B1* | 4/2020 | Stansell | G06F 40/166 |
| 2003/0051022 A1* | 3/2003 | Sogabe | G06F 16/958 |
| | | | 709/223 |
| 2003/0097639 A1 | 5/2003 | Niyogi et al. | |
| 2007/0214409 A1 | 9/2007 | Miyata | |
| 2012/0047199 A1 | 2/2012 | Patrawala et al. | |
| 2012/0226971 A1 | 9/2012 | Tocchini et al. | |
| 2013/0124968 A1* | 5/2013 | Dontcheva | G06F 40/106 |
| | | | 715/234 |
| 2013/0305145 A1 | 11/2013 | Jackson et al. | |
| 2013/0326337 A1 | 12/2013 | Lehmann et al. | |
| 2014/0122255 A1 | 5/2014 | Snyder | |
| 2014/0208202 A1 | 7/2014 | Ellis et al. | |
| 2014/0258849 A1* | 9/2014 | Chung | G06F 40/106 |
| | | | 715/243 |
| 2014/0372874 A1 | 12/2014 | Marseille | |
| 2015/0020010 A1 | 1/2015 | Hale et al. | |
| 2015/0074504 A1 | 3/2015 | Steinfl et al. | |
| 2015/0074518 A1 | 3/2015 | Rumsey et al. | |
| 2015/0310124 A1* | 10/2015 | Ben-Aharon | G06F 40/106 |
| | | | 715/205 |
| 2015/0378575 A1 | 12/2015 | Kaplinger et al. | |
| 2016/0092428 A1 | 3/2016 | Ilic et al. | |
| 2016/0292134 A1* | 10/2016 | Elings | G06F 40/131 |
| 2017/0091152 A1 | 3/2017 | Antipa et al. | |

OTHER PUBLICATIONS

Nasty Gal, Inc., "Clothes," found online at: www.nastygal.com/clothes, printed Sep. 2, 2014 (2 pages).

Jeni's Splendid Ice Creams, "Home," online at: www.jenis.com, printed Sep. 2, 2014 (2 pages).

"Responsive Web Design Patterns," found online at https://developers.google.com/web/fundamentals/layouts/rwd-patterns/ ; printed Sep. 5, 2014 (2 pages).

Responsive Web Design Basics found online at https://developers.google.com/web/fundamentals/layouts/rwd-fundamentals/ ; accessed Sep. 5, 2014, printed Jan. 29, 2016 (4 pages).

\* cited by examiner

USER INTERFACE DESIGN SYSTEM

BACKGROUND

Online shopping is a continuously growing industry. A user engaging in online shopping can locate potential products of interest in a number of ways, including by conducting Internet searching or going directly to a website known by the user. There are an increasing number of devices through which the user can access a website of a retailer. These devices can provide a number of complications for a website designer. For example, the devices can have different screen sizes, screen resolutions, and other display differences, as well as other hardware differences that cause different processing speeds and the like. Retailers and web designers in general, may, for example, create different website formats and layouts to work with different devices. While this may provide working websites, it can also lead to differences in look and feel of a website. Additionally, in one web design, the website for a mobile device (e.g., tablet, cellular phone, or the like) may not include all features of a website that is designed for viewing from a standard computer monitor. Improved ways to present products to a user for possible purchase on a website are desirable.

SUMMARY

This disclosure generally relates to the field of responsive web design. More specifically, this disclosure relates to predictably designing in a responsive web design system.

A method for creating a graphical user interface layout library is disclosed. The method includes receiving one or more user interface parameters from an input device of a web designer device; identifying, by the web designer device, one or more user interface layouts based on the one or more user interface parameters received; and providing the one or more user interface layouts identified to be stored in a user interface layout library database, the one or more user interface layouts being configurable by the web designer device A web design system is disclosed. The system includes an application that is loadable onto a web designer device. The web designer device includes a display and an input device. When loaded onto the web designer device, the application permits a web designer to identify one or more user interface parameters for constraining a user interface, determine one or more user interface layouts based on the one or more user interface parameters, and store the one or more user interface layouts in a user interface layout library database.

A method of creating a graphical user interface layout library is also disclosed. The method includes receiving one or more user interface parameters from an input device of a web designer device; identifying, by the web designer device, one or more user interface layouts based on the one or more received user interface parameters, wherein the one or more identified user interface layouts includes a plurality of tiles arranged according to the one or more identified user interface layouts; and storing the one or more identified user interface layouts in a user interface layout library database, the one or more identified user interface layouts being configurable by the web designer device. The one or more identified user interface layouts are displayable on a display of a user device, and wherein one of the one or more identified user interface layouts is selected for displaying based on the display of the user device.

A web design system is also disclosed. The web design system includes an application that is loadable onto a web designer device, the web designer device including a display, and an input device, and that when the application is loaded onto the web designer device permits a web designer to provide one or more user interface parameters for constraining a user interface via the input device of the web designer device, determine one or more user interface layouts based on the one or more provided user interface parameters, and store the one or more identified user interface layouts in a user interface layout library database.

A method of displaying a user interface according to a graphical user interface layout library is also disclosed. The method includes providing the graphical user interface layout library. Providing the graphical user interface layout library includes receiving one or more user interface parameters from an input device of a web designer device; identifying, by the web designer device, one or more user interface layouts based on the one or more user interface parameters received; and storing the one or more identified user interface layouts in a user interface layout library database, the one or more identified user interface layouts being configurable by the web designer device; receiving a request from a user device to display the user interface, the request including one or more user device parameters; and displaying the user interface on a display of the user device based on the request.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure generally relates to the field of responsive web design. More specifically, this disclosure relates to predictably designing in a responsive web design system.

The constantly increasing number of user devices capable of being used to visit a website can complicate the web design process. Web designers may, in particular, strive to create a website that is displayed in a similar manner regardless of the device. That is, the increasing number of devices with different displays (e.g., different display size, different display resolution, or the like) is making it increasingly difficult for a web designer to maintain a similar look and feel (e.g., layout, color scheme, text-identifying branding, shapes, fonts, button/link behavior, or the like) for a website across the various devices. In particular, maintaining a same or similar layout across devices can be difficult.

In some cases, a website can include one or more functions that are not even possible depending upon the device from which the website is viewed. For example, web designers commonly create mobile versions of a website that are displayed when, for example, a user visits the website using a cellular phone, a tablet device, or other similar mobile device. In such cases, the web designers also maintain a standard or full version of the website that is viewable from a personal computer, a laptop computer, or the like. The web designer may be able to generally maintain a somewhat similar look and feel (e.g., layout, color scheme, text-identifying branding, shapes, fonts, button/link behavior, or the like) between the two versions. However, functionality often differs between the two versions. Accordingly, although a user visiting the website on the various devices may recognize that the websites are owned and maintained by the same entity (e.g., a retail organization, etc.) the variations in functionality may frustrate users visiting the website via mobile devices (e.g., cellular phones, tablet devices, or the like).

In some embodiments, utilizing features of responsive web design (RWD), web designers are able to design a single website capable of being viewed using a plurality of devices. For example, a web designer can select a desired number of columns for a website when displayed on each of a plurality of devices. That is, the web designer can select a first number of columns for the website when displayed on, for example, a display device of a personal computer (PC); a second number of columns for the website when displayed on, for example, a tablet device; and a third number of columns for the website when displayed on, for example, a cellular phone device. It is to be appreciated that in some embodiments the number of columns for the website on a particular device may be variable depending upon the size of, for example, a web browser or application interface of the device. For example, when a web browser on a PC is reduced in size from a relatively larger browser window to a relatively smaller browser window, the website may be modified from the first number of columns to the second number of columns or the third number of columns—depending on the size of the browser window.

Although utilizing RWD enables a web designer to create a single website viewable by a variety of devices, there are often scenarios in which the look and feel of the website does not appear similarly between the devices. This can generally arise when, for example, elements on the website are relatively positioned. When the browser processes the Hypertext Markup Language ("HTML") instructions which cause a realignment of the relatively positioned elements, the relatively positioned elements may not be placed in a similar manner across devices. In order to ensure the relatively positioned elements are placed in a predictable pattern, a web designer can create a library of web designs. Embodiments of this disclosure are directed to enabling a web designer or the like to create a library of user interface layouts which enable the web designer to capture a similar look and feel for a website across a variety of devices.

In some embodiments, a website can be viewed by a user having a visual impairment. For example, a user may be using a device (e.g., a smartphone, a tablet, a personal computer, etc.) that includes an accessibility functionality that enables a user with a visual impairment to browse through a screen of options relying on a combination of touch and auditory responses to the touches. As a result of the website being capable of being browsed in this manner, an order of images being displayed in the website may be increasingly important to ensure that a user experience browsing the website is consistent across various devices and/or browser window sizes.

A "tile," as used in this specification, includes a discrete portion of a website. The tile can include any type of content for display on the website. Examples of content include, but are not limited to, images, text, advertisements, animations, videos, or the like, along with suitable combinations thereof. In some embodiments, a tile can have a pixel dimension of 512 pixels×512 pixels.

A "website," as used in this specification, is a website system including at least one server that is connectable to the Internet and that is configured to provide a website that is viewable on the Internet. The website can display a plurality of images, text, advertisements, animations, videos, or the like, along with suitable combinations thereof.

"Responsive web design (RWD)," as used in this specification, includes programming language and function calls generally used to adapt a particular website design to a particular user device (e.g., a display of a personal computer, a cellular phone display, a display on a tablet device, or the like) on which the website is being viewed. For example, the RWD functionality may include repositioning, resizing, or the like, of elements of the website (e.g., images, text, or the like) in order to fit the content on the display.

Figure 1:
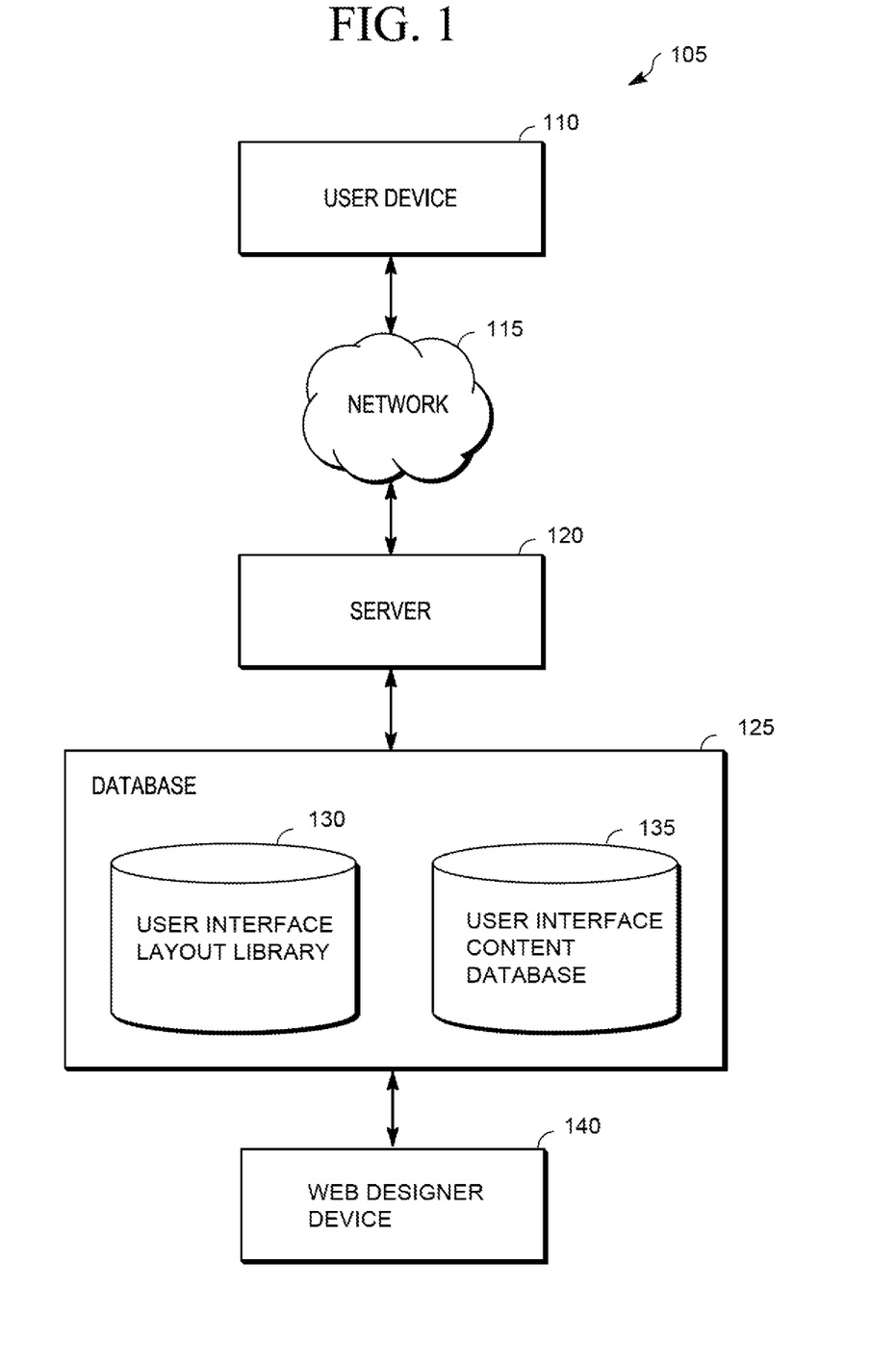
FIG. 1 is a schematic diagram of a system for implementing a web design tool as described herein, according to an embodiment.

FIG. 1 is a schematic diagram of a system 105 for implementing a web design tool for creating a user interface layout library as described herein, according to an embodiment.

In the system 105, a user device 110 is connected in communication with a server 120 via a network 115. A website can be loaded onto the user device 110 that enables a user, for example, to purchase one or more products from a retail organization. The web design tool can, for example, allow a web designer to maintain a user interface layout library so that a user can view the website from any of a plurality of devices, and the website will have a similar look and feel regardless of the user device 110.

The server 120 can make a graphical user interface (GUI) available to the user device 110. The server 120 makes the GUI available over the network 115 according to principles known in the art suitable for allowing a user to access and view the GUI with the user device 110. In an embodiment, aspects of the server 115 are the same as or similar to aspects of a server device 535 as described in accordance with FIG. 5 below. It is to be appreciated that the website loaded on to the user device 110 can include one or more features of the server 120. For example, the application can make the GUI available to the user device 110 in an embodiment.

The network 115 can include, but is not limited to, a local area network (LAN), a wide area network (WAN), a wireless network, a cellular data network, or the like. The network 115 can be a wired network, a wireless network, or suitable combination thereof. In an embodiment, aspects of the network 115 can be the same as or similar to aspects of a network 540 as described in accordance with FIG. 5 below.

The server 120 is in communication with a database 125. The database 125 generally includes information relating to the website. In the illustrated embodiment, the database 125 includes a user interface layout library 130 and a user interface content database 135. It is to be appreciated that the database 125 can include fewer or additional databases. For example, the database 125 can additionally include a product details database with information about one or more products being displayed via the website.

The user interface layout library 130 can, for example, include information identifying a plurality of website layout designs. The user interface library 130 can, in some embodiments, include a plurality of preferred user interface layouts and a plurality of less preferred user interface layouts.

A preferred user interface layout can include, for example, a user interface that when formatted according to a particular viewing device does not include one or more blank tiles. Examples of a preferred user interface layout are described in accordance with FIGS. 2A-2C below. In some embodiments, a preferred user interface can include a user interface in which an order of the tiles displayed is consistent regardless of the user device 110 or a size of the browser window. In some embodiments, this can, for example, reduce a processing time for loading the preferred user interface layout. In some embodiments, this can enable the preferred user interface to be browsed by a user using an accessible device such that the user experience in browsing the preferred user interface layout is consistent across the various user devices and sizes. That is, the preferred user interface layout can include a layout that is displayed so that the look and feel are the same or substantially similar regardless of the user device 110 or the size of the browser window, as well as a layout that when an accessibility program (e.g., as built in to an operating system of the user device 110, or an add-on application, etc.) is enabled, a non-visual feedback (e.g., voice rendering, etc.) of the layout is the same or substantially similar regardless of the user device 110 or the size of the browser window.

A less preferred user interface layout can include, for example, a user interface that when formatted according to a particular viewing device includes one or more blank tiles. Examples of a less preferred user interface layout are described in accordance with FIGS. 3A-3C below. The user interface layout library 130 can be populated by a web designer using web designer device 140. It is to be appreciated that the web designer generally populates the user interface layout library 130 according to principles described below, particularly within the method described in accordance with FIG. 4 below. The web designer may include one or more rules or conditions that determine whether a user is presented with a preferred or a less preferred user interface layout. These rules or conditions can be, for example, based on a size of the user device 110, the type of the user device 110, or the like. In some embodiments, the rules or conditions can also be, for example, based on whether the web designer wants to display additional content in the one or more blank tiles (e.g., an advertisement, a product video, or the like). In some embodiments, the user interface layout library 130 can include more user interface layouts than are accessible to the user device 110. For example, the user interface layout library 130 may include a number of user interface layouts, and only a subset of that number may be identified as displayable to the user device 110. Accordingly, the web designer may be able to selectively determine which user interface layouts can be displayed and may indicate that other user interface layouts should not be displayed. In some embodiments, this can include marking preferred user interface layouts for display and marking less preferred user interface layouts to not be displayed.

The user interface content database 135 can, for example, include one or more images, text, or the like, for populating the contents of the website according to the selected user interface layout library 130. The user interface layout library 130 can, for example, include the layout for the website to be displayed on the user device 110 and the user interface content database 135 can include the content to be displayed on the website, according to some embodiments.

Figure 2A:
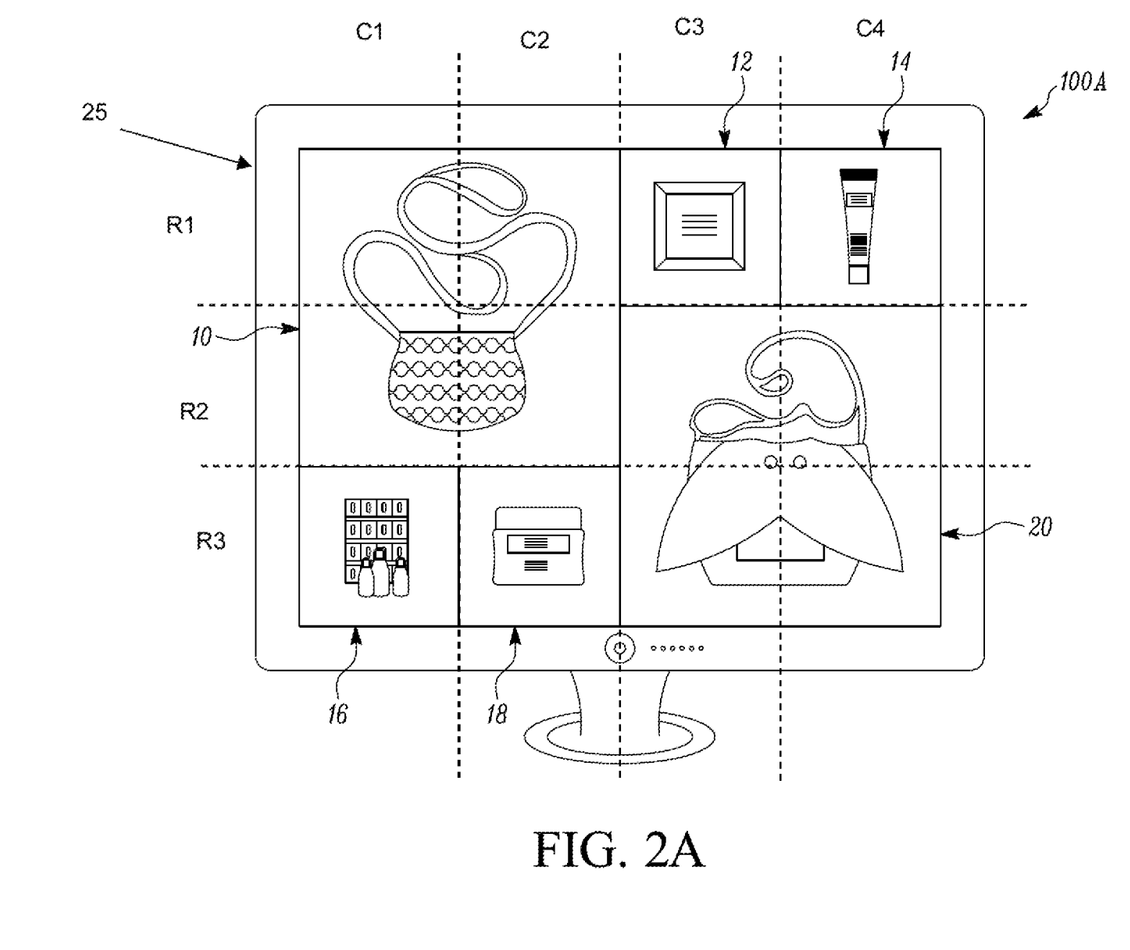
FIG. 2A illustrates a graphical user interface as displayed on a user device, according to some embodiments.
Figure 2B:
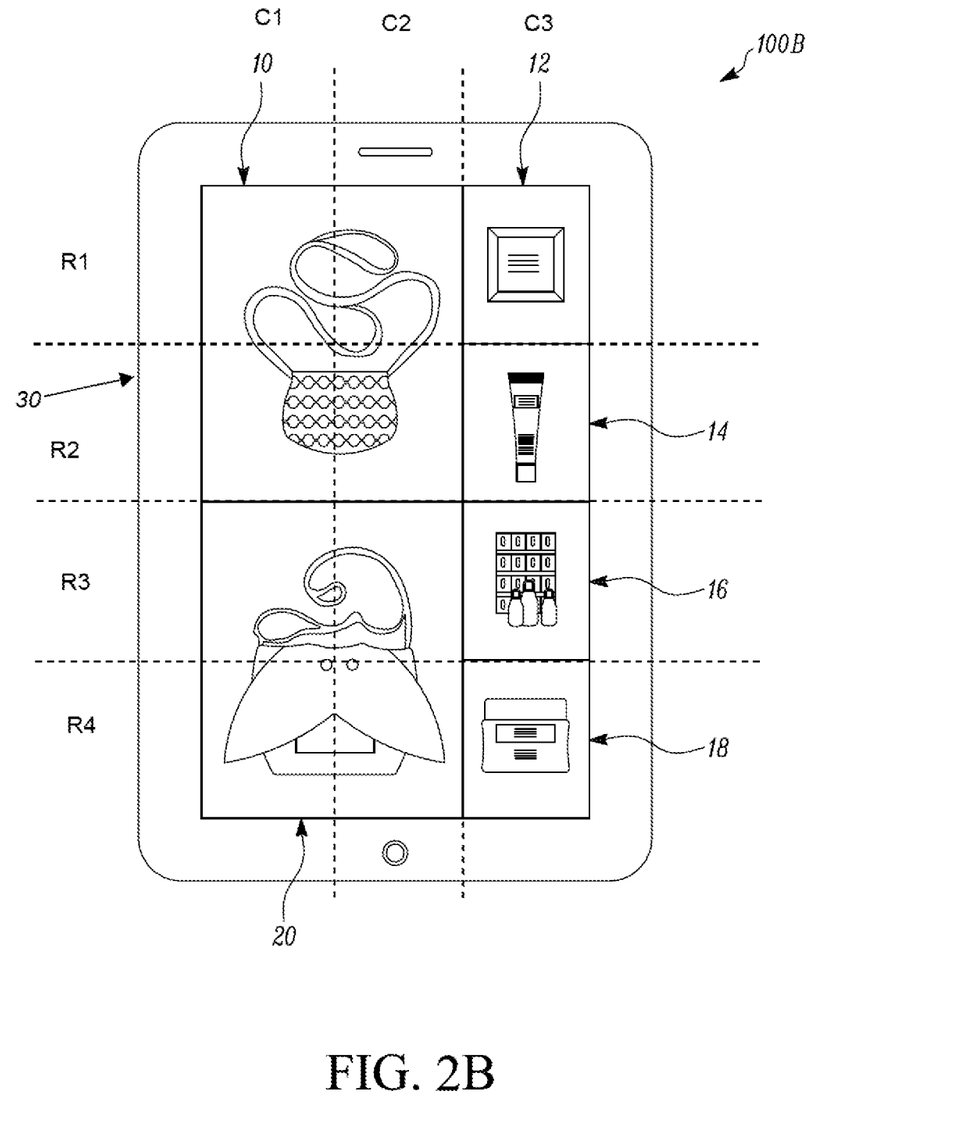
FIG. 2B illustrates the graphical user interface of FIG. 2A as displayed on another user device, according to some embodiments.
Figure 2C:
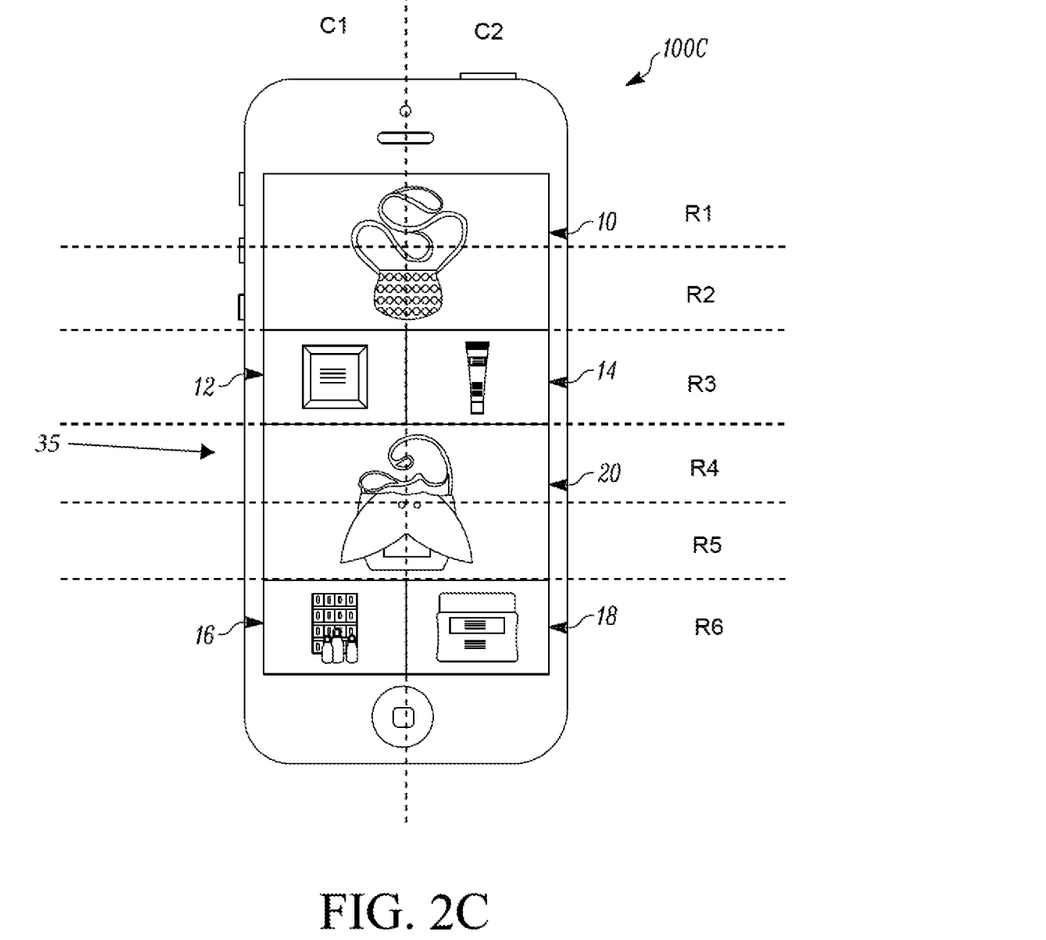
FIG. 2C illustrates the graphical user interface of FIG. 2A as displayed on another user device, according to some embodiments.

FIGS. 2A-2C illustrate graphical user interfaces (GUIs) 100A-100C as displayed on various user devices (e.g., a user device 501 as described in accordance with FIG. 5 below), according to some embodiments. The GUIs 100A-100C represent one possible preferred user interface layout. The illustrations include a display device 25 (FIG. 2A), a tablet device 30 (FIG. 2B), and a cellular phone 35 (FIG. 2C). It is to be appreciated that these are intended to be examples, and that other user devices (e.g., a laptop computer 505 as discussed further in accordance with FIG. 5 below) having a display are within the scope of this disclosure. The GUIS 100A-100C are representative of a GUI as configured by, for example, a web designer.

The GUIs 100A-100C are generally representative of a website. The website can, for example, be a website of a retailer configured to enable a consumer to purchase one or more products from the retailer. The images, and accordingly the products depicted, are intended to be an example of what a retailer could display. It is to be appreciated that the images may be varied and can, for example, be dependent upon the products sold by the retailer. It is to be appreciated that the GUIs 100A-100C can alternatively be representative of a user interface for an application such as, but not limited to, an application for the tablet device 30 or the cellular phone 35.

Each of the tiles 10-20 are depicted as including product images without text. The tiles can alternatively include text or combinations of text and one or more product images. Further, the images can be of something other than a product for sale. For example, the images can relate to the retailer. The size of the tiles 10-20 is an example of a possible size, and generally may be modified. The GUIs 100A-100C include a plurality of images shown in discrete tiles 10-20. The tiles 10-20 can include borders to illustrate the delineation between each of the tiles. It is to be appreciated that the borders may not be present in some embodiments. In some embodiments, the images for the tiles 10-20 can have an aspect ratio which is the same for the display device 25 (FIG. 2A), the tablet device 30 (FIG. 2B), and the cellular phone 35 (FIG. 2C). In some embodiments, the images for the tiles 10-20 can have an aspect ratio which is different for the display device 25 (FIG. 2A), the tablet device 30 (FIG. 2B), and the cellular phone 35 (FIG. 2C).

The illustrated embodiments include a plurality of dashed lines dividing the display device 25 (FIG. 2A), the tablet device 30 (FIG. 2B), and the cellular phone 35 (FIG. 2C) into a plurality of rows and columns. The columns are identified as Cn and the rows are identified as Rm, with m and n representing integers. In the illustrated embodiments, the integer n varies between 2 and 4 and the integer m varies between 1 and 6, depending on the embodiment. The GUI 100A as illustrated on display device 25 (FIG. 2A) is separated into four columns C1-C4 and three rows R1-R3. The tablet device 30 (FIG. 2B) is separated into three columns C1-C3 and four rows R1-R4. The cellular phone 35 (FIG. 2C) is separated into two columns C1-C2 and six rows R1-R6.

The tiles 10-20 can have various sizes in relation to the number of rows and columns for the GUIs 100A-100C. For example, the tiles 10 and 20 are 2×2 tiles. That is, the tile spans 2 columns and 2 rows. The tiles 12, 14, 16, and 18 are 1×1 tiles (e.g., 1 row×1 column). The number of rows and columns can vary. The number of rows may be greater than three, in which case the user may be able to navigate to the other rows (not shown) by scrolling down on the GUI 100A. The number of columns may be varied as well. However, the number of columns selected for the GUI 100A can be based on the number of columns in the GUIs 100B and 100C.

FIG. 2A illustrates the GUI 100A as displayed on a display device 25. The display device 25 can be any of a variety of types of display devices. Examples of devices suitable to serve as the display device 25 include, but are not limited to, a cathode ray tube (CRT) monitor, a liquid crystal display (LCD) monitor, a light emitting diode (LED) monitor, or the like. Aspects of the display device 25 can be the same as or similar to aspects of a display 516 (discussed further in accordance with FIG. 5 below). The GUI 100A is illustrated as filling an entire viewable area (e.g., an entirety of the display device 25) of the display device 25. It is to be appreciated that the GUI 100A can be resized by a user such that the GUI 100A does not fill the entire viewable area of the display device 25. If the GUI 100A does not fill the entire viewable area of the display device 25, one or more additional images, text, applications (e.g., other than a web browser being used to display the GUI 100A), or the like, can be shown on the display device 25. The resizing of the GUI 100A can cause modification of the GUI 100A similarly to resizing in accordance with switching to view the GUI 100A with a different device, according to some embodiments. That is, resizing the GUI 100A may cause the GUI 100A to be displayed similarly to the GUIs 100B, 100C, depending on a size selected by a user.

With reference to FIG. 2B, the GUI 100B is illustrated as being displayed on a tablet device 30. The GUI 100B as displayed on the tablet device 30 includes three columns. In some embodiments, the GUI 100B can be resizable to include a different number of columns. In some embodiments, three may be the maximum number of columns. The number of columns selected for display in the GUI 100B can be based on, for example, the number of columns in the GUI 100A, the size of the display on the tablet device 30, combinations thereof, or the like.

With reference to FIG. 2C, the GUI 100C is illustrated as being displayed on a cellular phone 35. The GUI 100C as displayed on the cellular phone 35 includes two columns. In some embodiments, the GUI 100C can be resizable to include a different number of columns. In some embodiments, two may be the maximum number of columns. The number of columns selected for display in the GUI 100C can be based on, for example, the number of columns in the GUI 100A and/or the GUI 100B, the size of the display on the cellular phone 35, combinations thereof, or the like.

In some embodiments, the number of columns selected for display in the GUIs 100A-100C can be used to determine a number and arrangement of tiles 10-20. For example, in the displayed embodiment, the number of tiles displayed is 12, which is the lowest common denominator between the number of columns 4, 3, and 2 in the GUIs 100A-100C. The number of tiles displayed may appear different to the user depending on a size of the tile selected (e.g., 2×2, 1×1, 3×3, or the like).

Figure 3A:
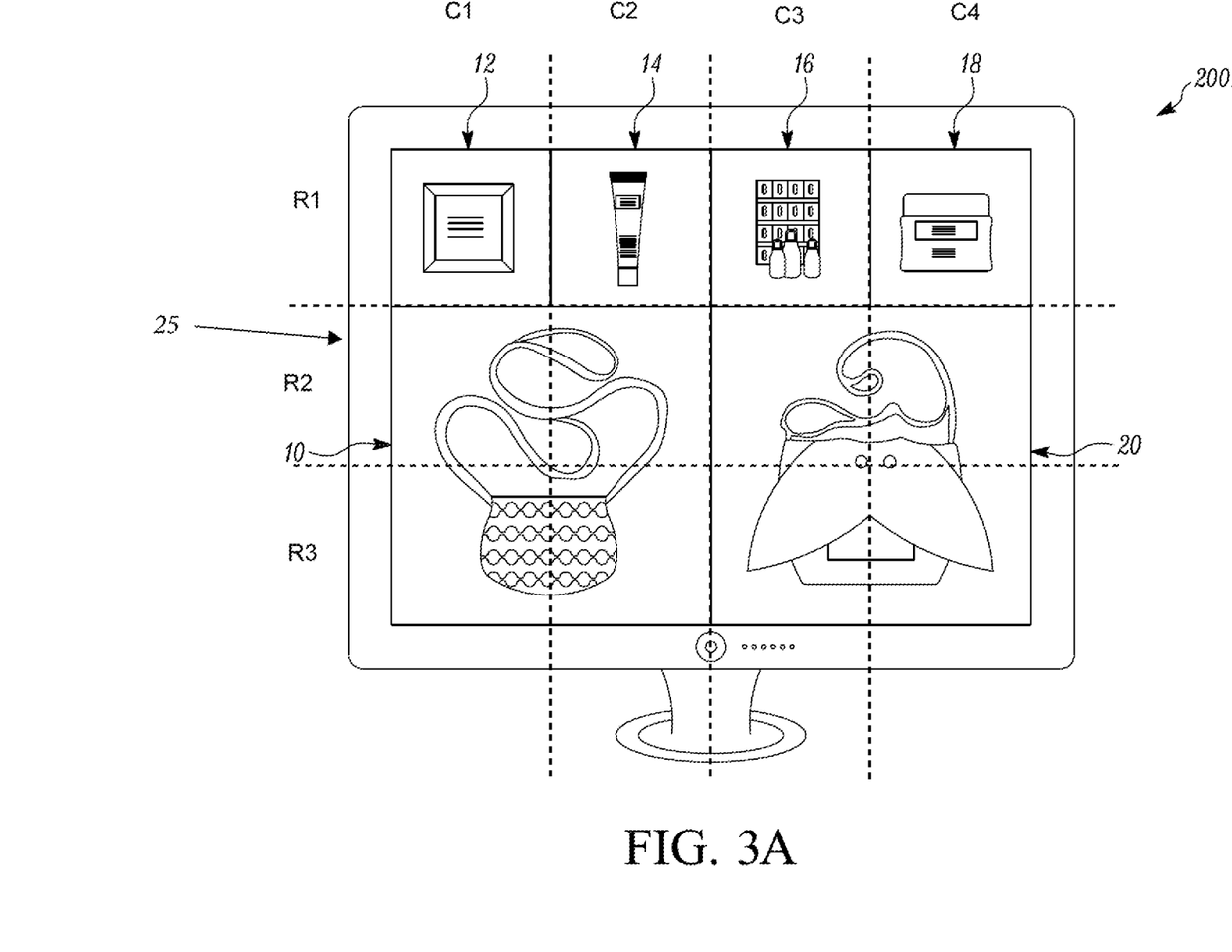
FIG. 3A illustrates a graphical user interface as displayed on a user device, according to some embodiments.
Figure 3B:
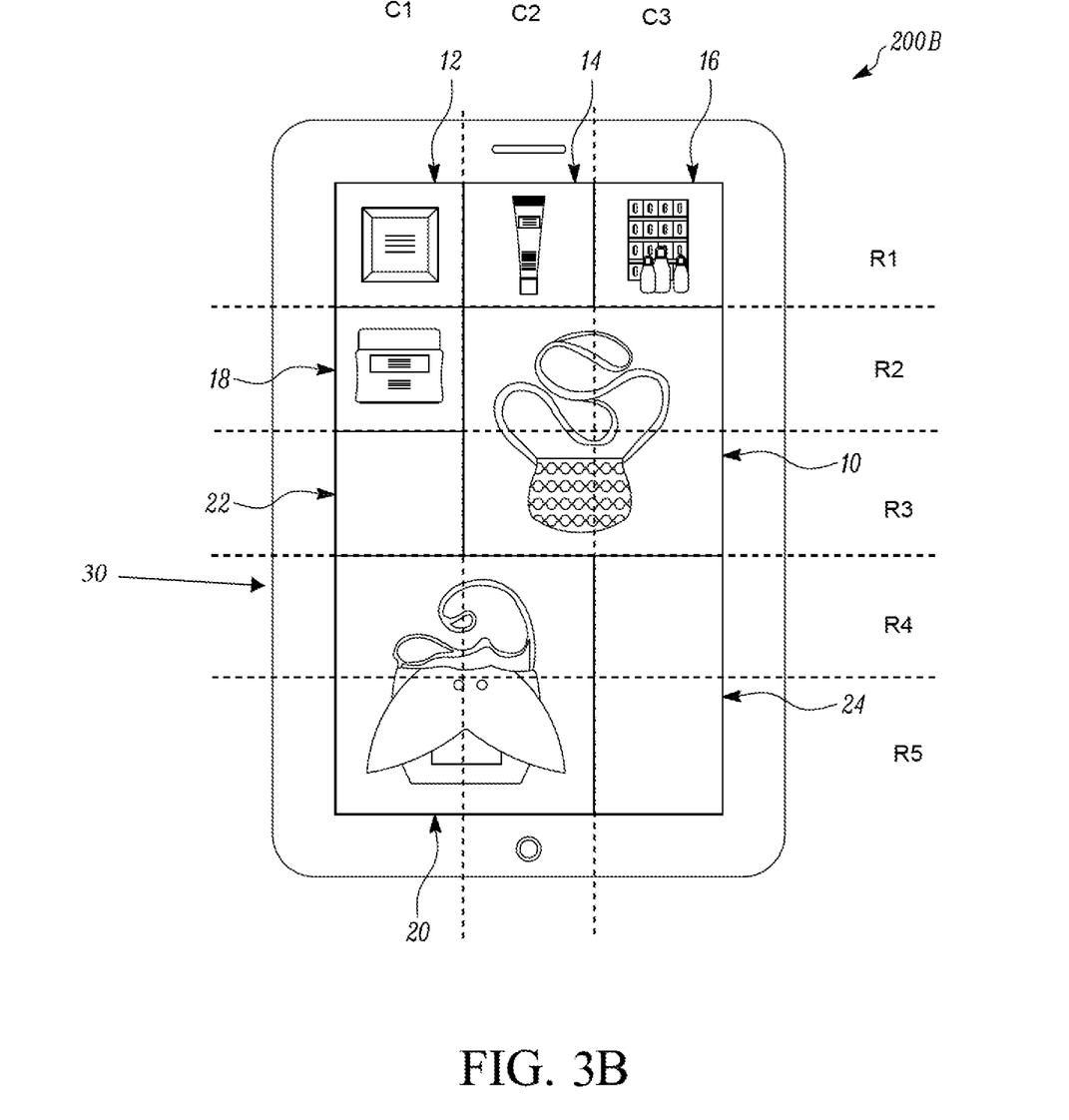
FIG. 3B illustrates the graphical user interface of FIG. 3A as displayed on another user device, according to some embodiments.
Figure 3C:
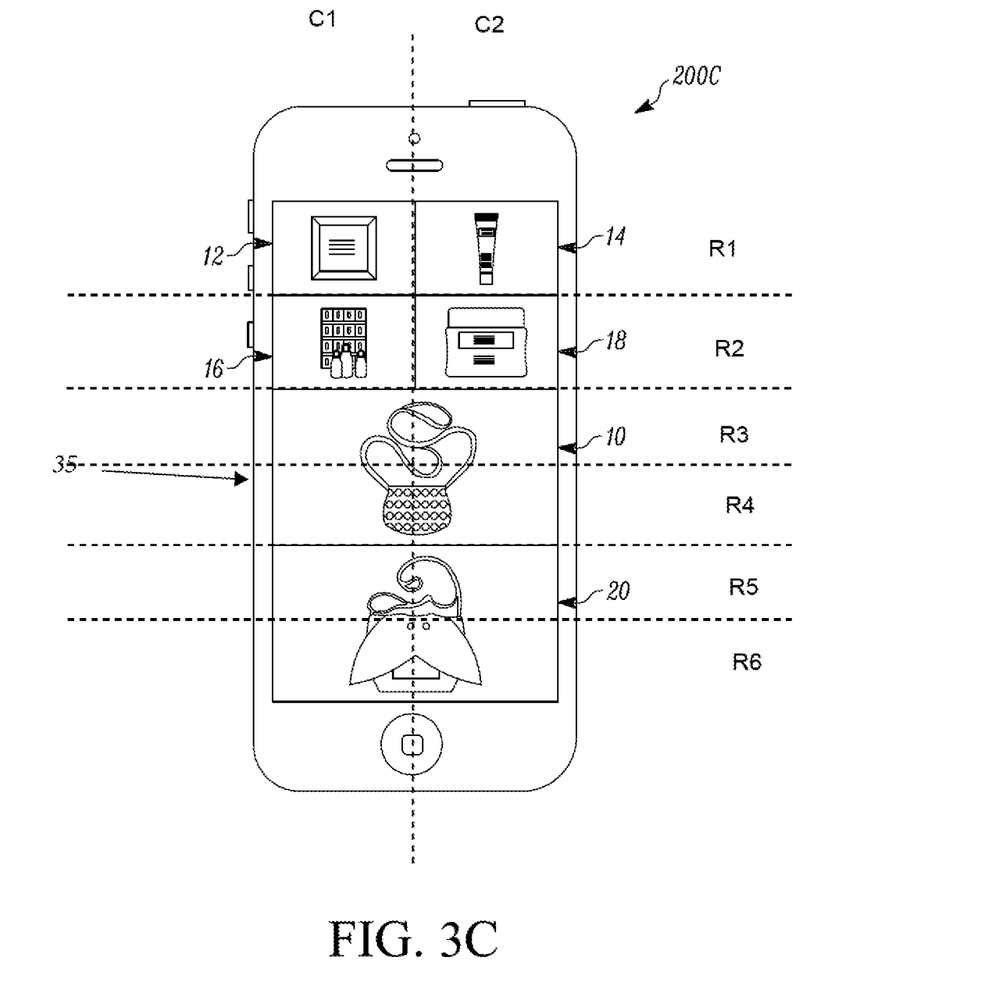
FIG. 3C illustrates the graphical user interface of FIG. 3A as displayed on another user device, according to some embodiments.

FIGS. 3A-3C illustrate graphical user interfaces 200A-200C as displayed on various user devices (e.g., a user device 501 as described in accordance with FIG. 5), according to some embodiments. The GUIs 200A-200C represent one possible less preferred user interface layout. The illustrations include a display device 25 (FIG. 3A), a tablet device 30 (FIG. 3B), and a cellular phone 35 (FIG. 3C). It is to be appreciated that these are intended to be examples, and that other user devices (e.g., a laptop computer 505 as discussed further in accordance with FIG. 5 below) having a display are within the scope of this disclosure. The GUIS 200A-200C are representative of a GUI as configured by, for example, a web designer.

The GUIs 200A-200C are generally representative of a website. The GUIs 200A-200C are generally representative of the website illustrated in GUIs 100A-100C of FIGS. 2A-2C with a different configuration of the tiles. The GUIs 200A-200C illustrate an example of a less preferred user interface layout which when adapted for display on a particular device includes one or more blank tiles. The website can, for example, be a website of a retailer configured to enable a consumer to purchase one or more products from the retailer. The images, and accordingly the products depicted, are intended to be an example of what a retailer could display. It is to be appreciated that the images may be varied and can, for example, be dependent upon the products sold by the retailer. Further, though each of the tiles 10-20 are depicted as including product images without text, the tiles can alternatively include text or combinations of text and one or more product images. Further, the size of the tiles 10-20 is an example of a possible size, and generally may be modified. The GUIs 200A-200C include a plurality of images shown in discrete tiles 10-20. The tiles 10-20 include borders to illustrate the delineation between each of the tiles. It is to be appreciated that the borders may not be present in some embodiments.

The illustrated embodiments include a plurality of dashed lines dividing the display device 25 (FIG. 3A), the tablet device 30 (FIG. 3B), and the cellular phone 35 (FIG. 3C) into a plurality of rows and columns. The columns are identified as Cn and the rows are identified as Rm, with m and n representing integers. In the illustrated embodiments, the integer n varies between 2 and 4 and the integer m varies between 1 and 6, depending on the embodiment. The GUI 200A as illustrated on display device 25 (FIG. 3A) is separated into four columns C1-C4 and three rows R1-R3. The tablet device 30 (FIG. 3B) is separated into three columns C1-C3 and four rows R1-R4. The cellular phone 35 (FIG. 3C) is separated into two columns C1-C2 and six rows R1-R6.

The tiles 10-20 can have various sizes in relation to the number of columns for the GUIs 200A-200C. For example, the tiles 10 and 20 are 2×2 tiles. That is, the tile spans 2 columns and 2 rows. The tiles 12, 14, 16, and 18 are 1×1 tiles (e.g., 1 row×1 column). The number of rows and columns can vary. The number of rows may be greater than three, in which case the user may be able to navigate to the other rows (not shown) by scrolling down on the GUI 200A. The number of columns may be varied as well. However, the number of columns selected for the GUI 200A can be based on the number of columns in the GUIs 200B and 200C.

FIG. 3A illustrates the GUI 200A as displayed on a display device 25. The display device 25 can be any of a variety of types of display devices. Examples of devices suitable to serve as the display device 25 include, but are not limited to, a cathode ray tube (CRT) monitor, a liquid crystal display (LCD) monitor, a light emitting diode (LED) monitor, or the like. Aspects of the display device 25 can be the same as or similar to aspects of a display 516 (discussed further in accordance with FIG. 5 below). The GUI 200A is illustrated as filling an entire viewable area (e.g., an entirety of the display device 25) of the display device 25. It is to be appreciated that the GUI 200A can be resized by a user such that the GUI 200A does not fill the entire viewable area of the display device 25. If the GUI 200A does not fill the entire viewable area of the display device 25, one or more additional images, text, applications (e.g., other than a web browser being used to display the GUI 200A), or the like, can be shown on the display device 25. The resizing of the GUI 200A can cause modification of the GUI 200A similarly to resizing in accordance with switching to view the website with a different device, according to some embodiments. That is, resizing the GUI 200A may cause the GUI 200A to be displayed similarly to the GUIs 200B, 200C, depending on a size selected by a user.

With reference to FIG. 3B, the GUI 200B is illustrated as being displayed on a tablet device 30. The GUI 200B as displayed on the tablet device 30 includes three columns. In some embodiments, the GUI 200B can be resizable to include a different number of columns. In some embodiments, three may be the maximum number of columns. The number of columns selected for display in the GUI 200B can be based on, for example, the number of columns in the GUI 200A, the size of the display on the tablet device 30, combinations thereof or the like. In the GUI 200B, a less preferred user interface layout is illustrated as when it is resized to meet the size of the table device 30, a plurality of empty areas 22 and 24 are added. The empty areas 22 and 24 can appear to a viewer as if the GUI 200B is not working correctly, and does not follow the same look and feel as the GUI 200A. In some embodiments, the empty areas 22 and 24 can be replaced by one or more advertisements or the like.

With reference to FIG. 3C, the GUI 200C is illustrated as being displayed on a cellular phone 35. The GUI 200C as displayed on the cellular phone 35 includes two columns. In some embodiments, the GUI 200C can be resizable to include a different number of columns. In some embodiments, two may be the maximum number of columns. The number of columns selected for display in the GUI 200C can be based on, for example, the number of columns in the GUI 200A and/or the GUI 200B, the size of the display on the cellular phone 35, combinations thereof, or the like.

Figure 4:
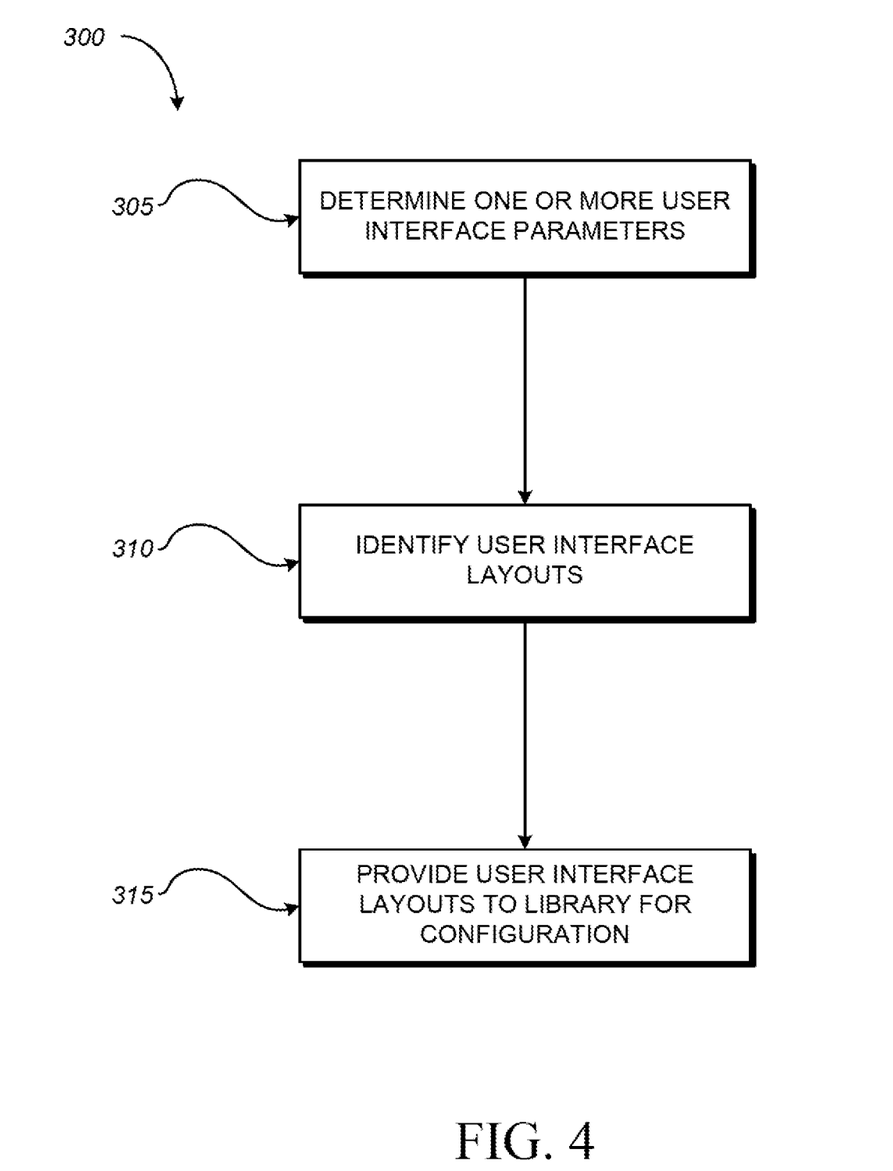
FIG. 4 is a flowchart illustrating a method for creating a graphical user interface (GUI) layout library, according to some embodiments.

FIG. 4 is a flowchart illustrating a method 300 for creating a graphical user interface (GUI) layout library, according to some embodiments. In some embodiments, the GUI layout library can be stored in a database (e.g., user interface layout library 130). The method 300 generally includes determining parameters for the user interface (e.g., GUIs 100A-100C of FIGS. 2A-2C) from a web designer device (e.g., the web designer device 140 of FIG. 1) and providing a plurality of configurable user interfaces to the web designer device 140 that can be stored in the user interface layout library 130. The user interface layout library 130 can, for example, be configured by the web designer such that a user accessing the GUI via a user device (e.g., the user device 110 of FIG. 1) receives a GUI having a similar look and feel regardless of the user device from which the user views the GUI.

The method 300 begins at 305 when one or more user interface parameters are determined. The one or more user interface parameters may be determined, for example, from an input of the one or more user interface parameters received from the web designer device 140. The user interface parameters define one or more constraints for a GUI. For example, the user interface parameters can include a number of columns to be displayed in a particular user interface, a maximum tile size (e.g., 3 rows×3 columns, etc.), a size trigger (e.g., which identifies when the user interface will be resized to display a different number of columns), or the like.

At 310, a plurality of user interface layouts are identified based on the one or more parameters determined at 305. The plurality of user interface layouts can include a plurality of preferred user interface layouts and a plurality of less preferred user interface layouts, according to some embodiments. In some embodiments, the plurality of user interface layouts can include the preferred user interface layouts, but not the less preferred user interface layouts. Examples of preferred designs and less preferred designs are identified in FIGS. 2 and 3, respectively. In some embodiments, it can be advantageous to identify both the preferred designs and the less preferred designs so that a GUI designer can, for example, create a user interface layout that includes advertisements or other content that is only displayed on a particular device (e.g., when a display area is a particular size). For example, a web designer may elect to include an advertisement or the like when the user interface is viewed on a tablet device (e.g., GUI 200B of FIG. 3B) but not when the user interface is viewed on a display device of a PC (e.g., GUI 200A of FIG. 3A) or a cellular phone (e.g., GUI 200C of FIG. 3C). To do so, the web designer may elect to use a less preferred user interface layout.

At 315, the plurality of user interface layouts can be stored in the user interface layout library 130.

Figure 5:
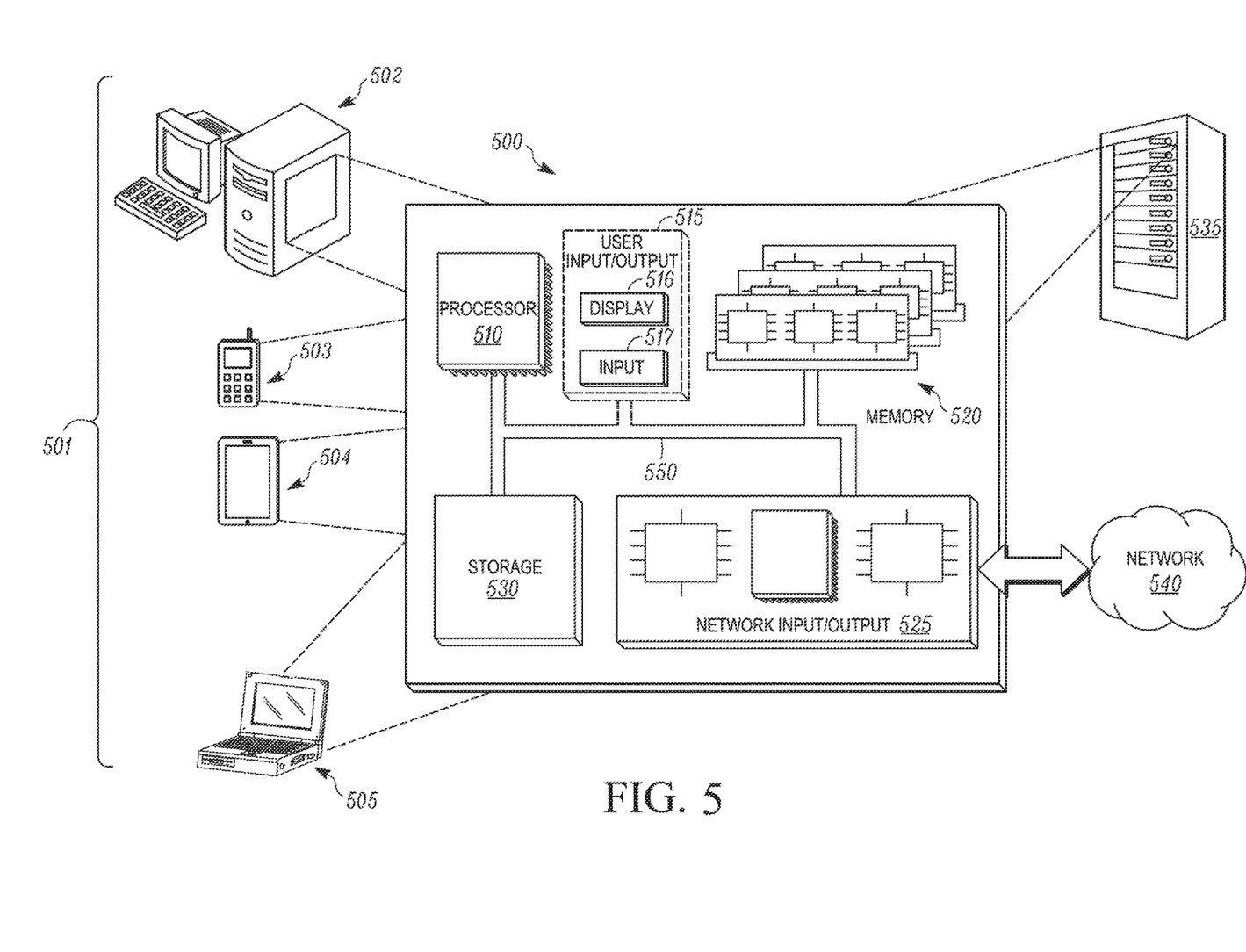
FIG. 5 is a schematic diagram for an architecture for a computing device, according to some embodiments.

FIG. 5 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM). Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used herein is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are examples only, with the true scope and spirit of the disclosure being indicated by the claims that follow.

What is claimed is:

1. A method of creating a graphical user interface layout library, comprising:
   receiving one or more user interface parameters, including one or more of a number of columns to be displayed on a user interface, a size trigger indicating when the user interface is to be resized to display a different number of columns, or a maximum tile size, from an input device of a web designer device;
   identifying, by the web designer device, two or more user interface layouts based on the one or more received user interface parameters, wherein at least one of the one or more received user interface parameters used for identifying the two or more user interface layouts is the number of columns to be displayed on the user interface, the size trigger, or the maximum tile size, and wherein each of the two or more identified user interface layouts includes a plurality of tiles arranged according to the particular user interface layout, the two or more user interface layouts including a less preferred user interface layout; and
   storing the two or more identified user interface layouts in a user interface layout library database, the two or more identified user interface layouts being configurable by the web designer device,
   wherein the two or more identified user interface layouts are displayable on a display of a user device.

2. The method according to claim 1, wherein the less preferred interface layout includes the plurality of tiles arranged such that the plurality of tiles include a blank tile.

3. The method according to claim 1, wherein the two or more user interface layouts include a preferred user interface layout having the plurality of tiles arranged such that the plurality of tiles do not include a blank tile.

4. The method according to claim 3, wherein an order of tiles displayed in the preferred user interface layout is displayable in a same order regardless of the user device or display size on which the preferred user interface layout is to be displayed.

5. The method according to claim 1, further comprising providing a content library for populating the two or more identified user interface layouts, the content library including a plurality of images in the content library, wherein each of the plurality of images has a single aspect ratio.

6. The method according to claim 5, wherein, for an image having a particular content, a plurality of images having different aspect ratios is stored for the particular content.

7. A web design system, comprising:
   a web designer device that includes one or more processors and one or more non-transitory tangible computer readable media; and
   an application that is loadable onto the web designer device, the web designer device including a display, and an input device, and that when the application is loaded onto the web designer device permits a web designer to provide one or more user interface parameters, including one or more of a number of columns to be displayed on a user interface, a size trigger indicating when the user interface is to be resized to display a different number of columns, or a maximum tile size, for constraining the user interface via the input device of the web designer device, determine two or more user interface layouts based on the one or more provided user interface parameters, wherein at least one of the one or more user interface parameters provided by the web designer used for determining the two or more user interface layouts is the number of columns to be displayed on the user interface, the size trigger, or the maximum tile size, and store the two or more identified user interface layouts in a user interface layout library database,
   wherein the two or more user interface layouts include a less preferred user interface layout.

8. The web design system according to claim 7, wherein the application further enables the web designer to configure each of the two or more determined user interface layouts via the input device of the web designer device.

9. The web design system according to claim 7, wherein the less preferred interface layout includes the plurality of tiles arranged such that the plurality of tiles include a blank tile.

10. The web design system according to claim 9, wherein the less preferred user interface layout is configurable by the web designer via the input device of the web designer device to include one or more advertisements to fill the blank tile.

11. The web design system according to claim 7, wherein the two or more user interface layouts include a preferred user interface layout having the plurality of tiles arranged such that the plurality of tiles do not include a blank tile.

12. The web design system according to claim 11, wherein an order of the plurality of tiles displayed in the preferred user interface layout is displayable is a same order regardless of a user device or display size on which the preferred user interface layout is to be displayed.

13. A method of displaying a user interface according to a graphical user interface layout library, comprising:
   providing the graphical user interface layout library, wherein the providing includes:
      receiving one or more user interface parameters from an input device of a web designer device, the one or more user interface parameters including one or more of a number of columns to be displayed on the user interface, a size trigger indicating when the user interface is to be resized to display a different number of columns, or a maximum tile size;
      identifying, by the web designer device, two or more user interface layouts based on the one or more user interface parameters received, wherein at least one of the one or more received user interface parameters used for identifying the two or more user interface layouts is the number of columns to be displayed on the user interface, the size trigger, or the maximum tile size, and wherein the two or more user interface layouts include a less preferred user interface layout; and
      storing the two or more identified user interface layouts in a user interface layout library database, the two or more identified user interface layouts being configurable by the web designer device;
   receiving a request from a user device to display the user interface, the request including one or more user device parameters; and
   displaying the user interface, using one of the two or more user interface layouts, on a display of the user device based on the request.

14. The method according to claim 13, wherein the one or more user interface parameters include one or more of a display size or a user device type.

15. The method according to claim 13, wherein displaying the user interface includes arranging the plurality of tiles on the display according to one of the two or more user interface layouts in the user interface layout library database.

16. The method according to claim 13, wherein displaying the user interface on the display of the user device based on the request includes selecting an image for a tile in the user interface layout, wherein the image is stored at a plurality of aspect ratios, and the aspect ratios correspond to displaying the image based on the one or more user device parameters.

17. The method according to claim 13, wherein the less preferred interface layout includes the plurality of tiles arranged such that the plurality of tiles include a blank tile.

18. The method according to claim 13, wherein the two or more user interface layouts includes a preferred user interface layout having the plurality of tiles arranged such that the plurality of tiles do not include a blank tile.

* * * * *